United States Patent [19]

Nakata et al.

[11] 4,255,861
[45] Mar. 17, 1981

[54] ELECTRICALLY DIGITAL DISPLAY MICROMETER

[75] Inventors: Kiyohiro Nakata; Hiroaki Suwa, both of Kure, Japan

[73] Assignee: Kabushiki Kaisha Mitutoyo Seisakusho, Tokyo, Japan

[21] Appl. No.: 53,729

[22] Filed: Jul. 2, 1979

[51] Int. Cl.³ .................................................. G01B 3/18
[52] U.S. Cl. .................................. 33/166; 33/125 C; 235/92 DN
[58] Field of Search ................. 33/166, 164 R, 143 L, 33/125 C; 324/34 PS, 34 D, 34 L, 34 TK; 235/92 EN, 92 DN, 92 MP; 340/347 P, 195

[56] References Cited

U.S. PATENT DOCUMENTS

| | | | |
|---|---|---|---|
| 3,482,321 | 12/1969 | Inshaw | 33/166 |
| 3,877,149 | 4/1975 | Masuda | 33/166 |
| 3,924,336 | 12/1975 | Inouk | 33/164 R |
| 4,034,477 | 7/1977 | von Voros | 33/143 L |
| 4,062,120 | 12/1977 | Lacagnina et al. | 33/166 |
| 4,103,427 | 8/1978 | Ledley | 33/125 C |

FOREIGN PATENT DOCUMENTS 1400293  7/1975  United Kingdom .................. 33/143 L

*Primary Examiner*—Willis Little
*Attorney, Agent, or Firm*—Brisebois & Kruger

[57] ABSTRACT

The invention is constituted such that a tubular cavity is formed in the arm of a frame which movably supports the spindle; said cavity houses an index scale and a slit disc; and thereby the measured results can be read as an electric signal without affecting the function of the micrometer, said index scale and said slit disc being located coaxial with the spindle.

11 Claims, 6 Drawing Figures

ELECTRICALLY DIGITAL DISPLAY MICROMETER

BACKGROUND OF THE INVENTION

1. Field of the Invention

The present invention relates to a micrometer which can electrically make a digital display of measured results.

The latest trend in micrometers is to design them such that the measured results can be digitally displayed. In some micrometers designed for digital display of measured results, the spindle movement is mechanically converted to a rotation, which drives a mechanical counter to make a digital display of measured results; and in others, the spindle movement is converted to an electrical signal, which causes an arithmetic circuit to drive an electric counter to make a digital display of measured results.

2. Description of the Prior Art

In a micrometer equipped with a mechanical counter for digital display, the rotation of the spindle is transmitted by gear and pinion for successive rotation of letter gears on the mechanical counter for digital display. In the micrometer of this type, however, the system for transmitting the spindle movement to the letter gears of the counter consists only of gearing; and because of limitations to the possibilities of enhancing the gear accuracy through elimination of backlash and slackness in the support of gear shaft, there is a limitation to improving the accuracy of readings.

It is for this reason that a micrometer has been developed which can give accurate readings of measured results as an electrical signal to which the spindle movement is converted.

For conversion of the spindle movement to an electrical signal, a differential transformer is utilized. For instance, a coil is attached to the micrometer body; the core member is made movable together with the spindle; and thus the coil can produce an electrical signal output proportional to the spindle movement. Such a micrometer is disclosed in the U.S. Pat. No. 3,924,336.

In another type of micrometer, a glass scale, a light-receiving element and a light-emitting element are combined or two discs with rotational shafts being eccentric to each other are installed, whereby the light-receiving element and the light-emitting element at their overlap portion yield an electrical signal. Such a micrometer is disclosed in the British Pat. No. 1,400,293.

In still another type, the readings of a displacement of a linear-variable scale are converted to an electrical signal, such being disclosed in the U.S. Pat. No. 4,062,120.

As mentioned above, several micrometers for electrical display of measured results have been proposed, but as a matter of fact they are not yet practically used, because it is difficult to incorporate electrical parts in them without deteriorating their performance.

SUMMARY OF THE INVENTION

The present invention aims at a micrometer for electrical display of measured results which is constructed such that a tubular cavity is formed in the arm of a frame which movably supports the spindle and in this cavity a rotary encoder is housed without affecting its function as well as the function of the micrometer; and electrical parts are effectively assembled into the frame with easiness of maintenance.

Another aim of the present invention is to provide a micrometer designed such that the disc-like index scale and a slit disc are coaxially installed; a light-emitting element and a light-receiving element are disposed opposing each other via said index scale and said slit disc; and an electrical pulse signal can be issued through a relative rotation of said index scale and said slit disc.

Still another aim of the present invention is to provide a micrometer equipped with a large-scale integrated circuit for counting the pulse signals and figuring out the measured results.

Other features and advantages of this invention will become apparent from the following detailed description of concrete examples thereof taken with reference to the accompanying drawings.

PREFERRED EMBODIMENTS OF THE INVENTION

Figure 1:
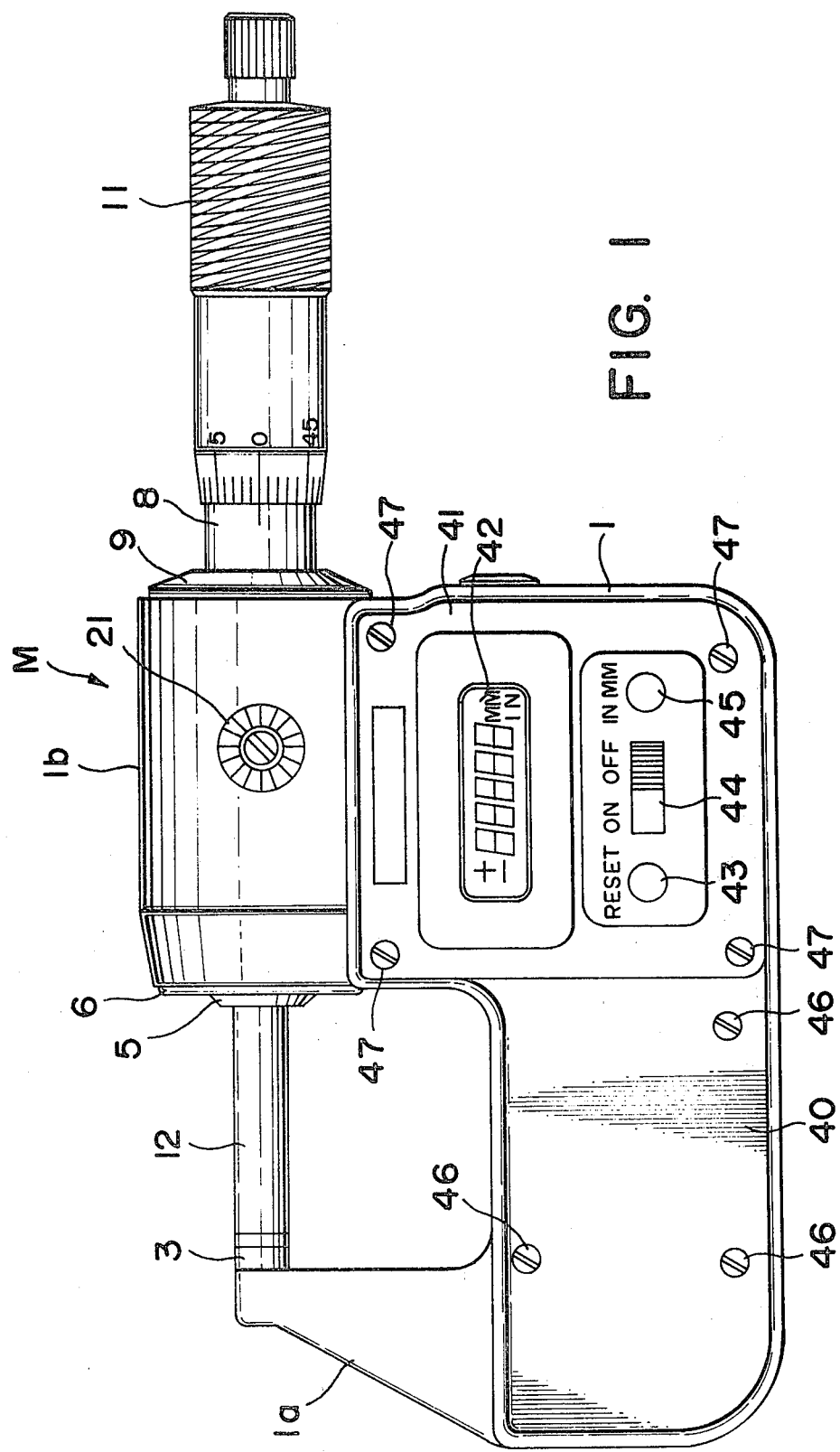
FIG. 1 is a front elevation view of a micrometer according to the invention.
Figure 2:
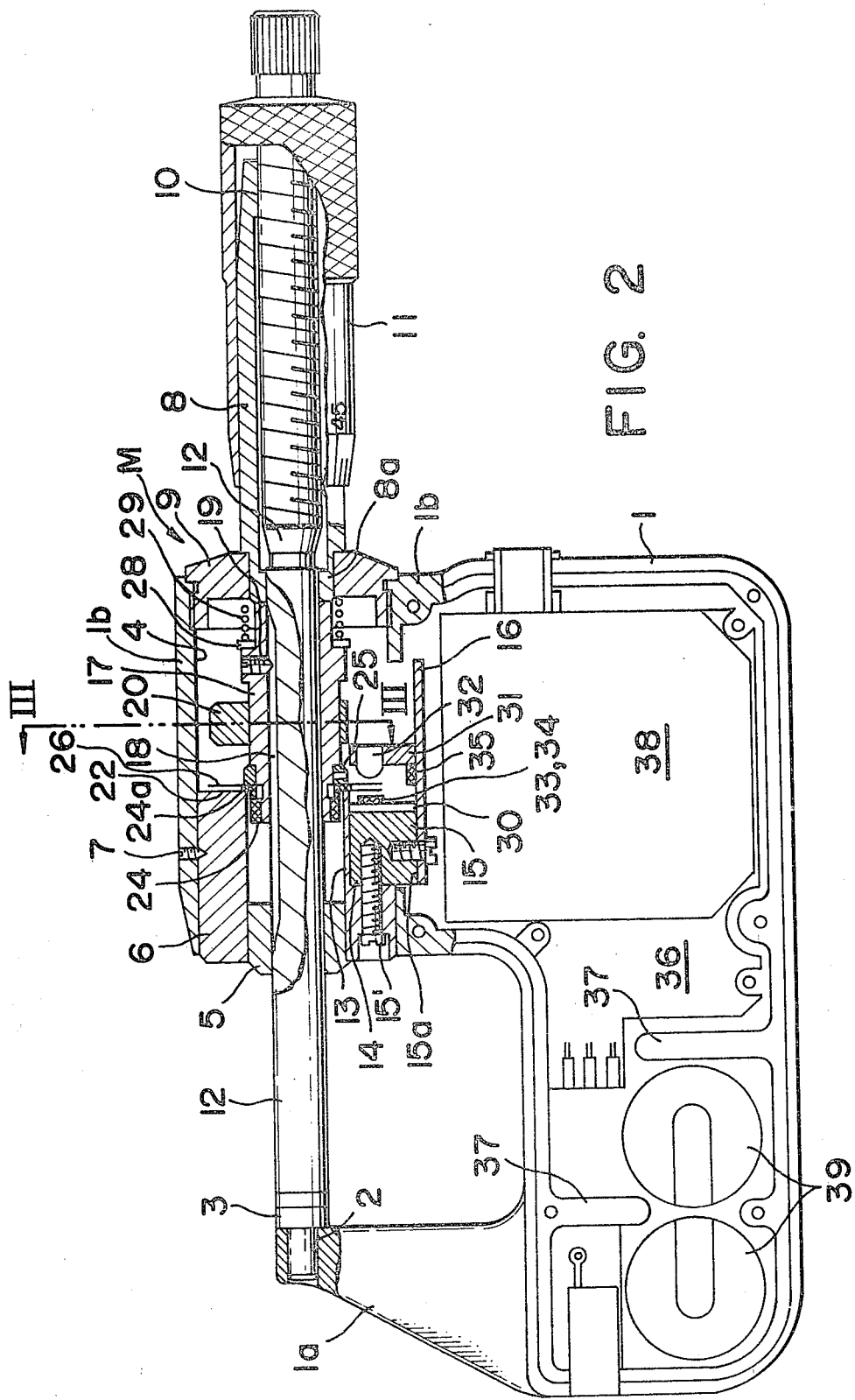
FIG. 2 is a sectional view illustrating the principal parts of the micrometer in FIG. 1.

In FIGS. 1 and 2, the frame 1 of the micrometer M is U-letter shaped; on one arm 1a of said frame 1 there is a small-diameter hole 2 bored, in which an anvil 3 is fitted. On the other arm 1b of said frame there is bored a large-diameter through hole 4 which is axially aligned with said hole 2. At one opening of said through hole 4 is dismountably attached a ring retainer 6 which integrally carries a bushing 5 constituting a part of the retainer. Said retainer 6 is secured to the arm 1b by a screw 7. At the other opening of said through hole 4 is dismountably screwed a covering 9 which is an integral part of the sleeve 8, to the threaded portion 10 of which is screwed a spindle 12 having a thimble 11. Said spindle 12 is held by said bushing 5 and a small-diameter part 8a of said sleeve 8 such that it can move up to or away from said anvil 3.

On one area of said ring retainer 6 there is formed a notch 14 with a flat portion 13 extending in the axial direction of said spindle 12. Within said notch 14 is fitted a block 15 with one side thereof in contact with said flat portion 13 and said block 15 is screwed to the retainer 6 by a screw 15'. A plate 16 is screwed to the surface 15a of said block 15 which is parallel to the flat portion 13 of said retainer 6.

Between said bushing 5 and said sleeve 8 comes a tubular piece 17, which is externally mounted on the spindle 12. There is a key groove 18 cut along the longitudinal direction of the spindle 12, and said tubular piece 17 is provided with a key 19 to fit into said key groove 18, whereby said tubular piece 17 and said spindle 12 are coupled together by means of said key 19 and said key groove 18 so that said tubular piece 17 can rotate together with said spindle 12 but the axial displacement of said tubular piece 17 is restrained by said bushing 5 and said sleeve 8.

Figure 3:
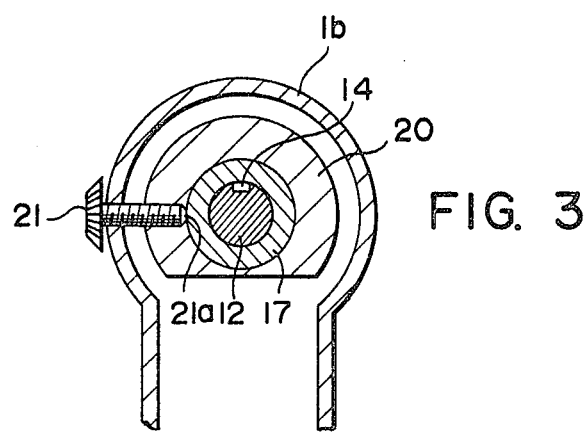
FIG. 3 is a sectional view along III—III of FIG. 2.

As seen from FIGS. 2 and 3, said tubular piece 17 is externally provided with a clamp ring 20, to which is screwed a clamp screw 21 running through the arm 1b; thus when said screw 21 is tightened, its tip 21a can squeeze said tubular piece 17, thereby restraining the spindle 12.

Figure 4:
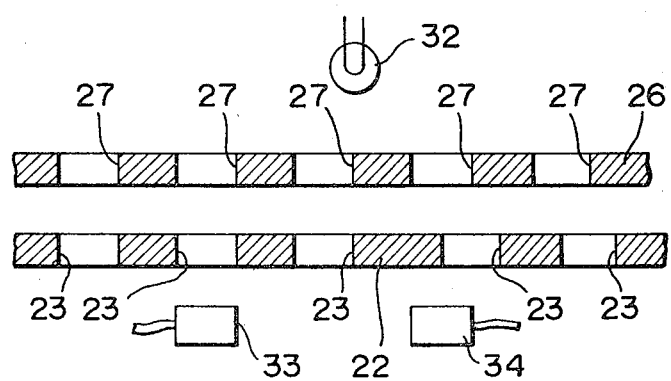
FIG. 4 is a schematic diagram showing the relation among the index scale, the slit disc, the light-emitting element and the light-receiving element.

Said tubular piece 17 has a slit disc 26 held between a spacer 24 and a ring 25; and in the circumferential direction of said slit disc 26 there are slits 27 - - - of same pitch radially extending (see FIG. 4).

The conventional slit disc is generally made of glass plate, but in the disc according to the present invention, radial slits are provided at equal intervals by etching or electric discharging on metal. Thus the disc can be made thin and compact; unlike a glass-made one, the slit portion according to the present invention does not reflect the light; the micrometer can be designed small; and there is no waste of energy in the cell.

On the inside of said ring retainer 6 is attached an index scale made of a metal sheet of dial shape, positioned at right angles to the spindle 12 and aligned with said slit disc 26.

At an opposite position to the block 15 in the notched part of the retainer 6 there are provided slits 23 - - - with the same pitch as the slit disc 26, at two locations staggered by ¼ pitch (see FIG. 4).

The index scale is designed such that its scale position is referred to a hole bored coaxially to the slit disc; thus said scale can be held in proper positional relation to the slits in said slit disc with the result that there is no likelihood of moire being caused or waveform of relative light intensity being disturbed.

In FIG. 4 for facilitating the understanding of the relations among the index scale 22, the slit disc 26 and the slits 23 - - - and 27 - - - , the index scale 22 and the slit 26 are represented linearly. The flanged part 24a of said spacer 24 is interposed between the index scale 22 and the slit disc 26; and a certain space is taken between the index scale 22 and the slit disc 26. Said tubular piece 17 has a spring bearing 28 and between said spring bearing 28 and said sleeve 8 comes a spring 29, which urges the tubular piece 17 toward the retainer 6 and, pressing the retainer 6 through the spacer thereby, eliminating the axial slackness of the tubular piece 17. Two holding plates 30, 31 are installed parallel to each other, holding said index scale 22 and said slit disc 26 therebetween, the plate 30 being fitted to the block 15 and the plate 31 to the plate 16. Said holding plate 31 has the light-receiving elements 33, 34 located at two positions behind the index scale 22 in opposition to a light-emitting element 32, so that when the slit disc 26 rotates, signal waves staggered by 90° in phase can be issued for identification of the rotating direction.

Said plate 16 is attached with a light-receiving element 35 to make direct measurement of the light from the light-emitting element 32 for regulation of the quantity of light.

Within said frame 1 is formed a cavity 36, in which a reinforcing rib 37 is provided. Said cavity 36 holds the power source 39 therewithin such as a silver cell, a lithium cell, a manganese cell or a rechargeable Nicd cell or lead cell in addition to the arithmetic unit 38 consisting of a large-scale integrated circuit. The open end of said cavity 36 is shielded with a covering 40 providing access for exchange of the power source 39 as well as with a panel 41. Said panel 41 is fitted with a digital display means 42, a resetting button 43, an ON-OFF switch 44 for the power source 39 and an inch-/millimeter change button 45. The panel 41 and the covering 40 are screwed to the frame by screws 46, 47, free to open or close.

Figure 5:
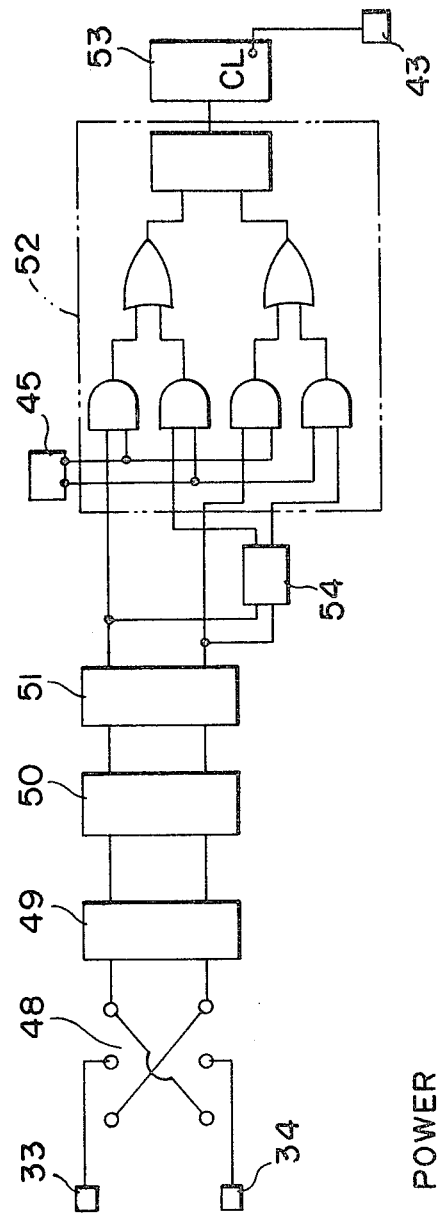
FIG. 5 is a block diagram of the arithmetic unit.

Next the constitution of the arithmetic unit 38 is to be described referring to the block diagram of FIG. 5.

In FIG. 5, 48 denotes a polarity-change circuit which changes plus or minus range incidental to the rotational direction of the spindle 12. The waveform rectifying circuit 49 rectifies a sine wave output from the light-receiving elements 33, 34 to a rectangular wave. 50 denotes a differential circuit to yield a differential wave from the rectangular output of said waveform rectifying circuit 49. 51 denotes a quarter divider circuit to divide the output of said differential circuit 50 into quarters. 52 Denotes a reversible counter circuit to count the pulses by counted pulse from the quarter divider circuit, addition/subtraction signals; it is reset to zero by the resetting button 43. 53 is a digital display circuit for measurement by the indicator 42. 54 Is an inch/millimeter converter to convert the measured unit from inch to millimeter or the other way round; it is operated by the inch/millimeter change button 45.

Here the power source 39 for the arithmetic unit 38, the light-emitting element 32 and the light-receiving elements 33, 34, 35 is a cell, but the cell is not the only means of power supply.

Figure 6:
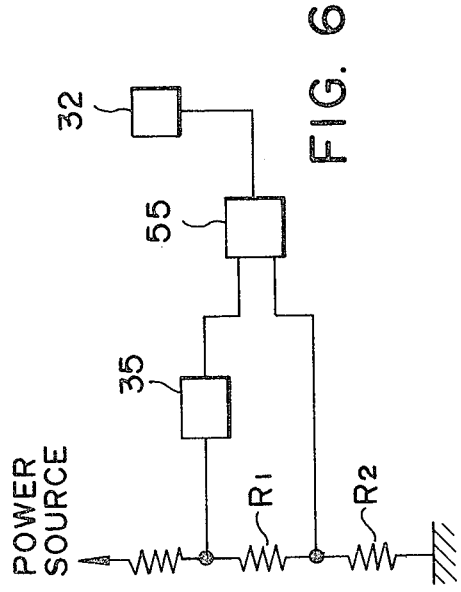
FIG. 6 is a block diagram of the electric circuit to control the quantity of light from the light-emitting element.

In FIG. 6 is illustrated a circuit to compensate for variation in the quantity of light from the light-emitting element 32 as caused by temperature change. The voltage of the power source 39 is devided into partial voltages by the voltage-dividing resistors $R_1$, $R_2$, one resistor being given via the light-receiving element 35 to, and the other resistor being given directly to, the integrating circuit 55 for comparison, whereby the quantity of light from said element 32 is regulated referring to the voltage generated at said element 35.

Electric circuits illustrated in FIGS. 5 and 6 are constituted as a large-scale integrated circuit.

In a micrometer of such constitution, with the switch 44 of the panel 41 set ON and the thimble 11 turned an object to be measured is inserted between the anvil 3 and the spindle 12. When the spindle 12 rotates, the tubular piece 17 rotates together with it, causing the scale disc 26 to turn relative to the index scale 22. Thereupon the beam of light between the light-emitting element 32 and the light-receiving elements 33, 34 is interrupted by the scale disc 26 and the index scale 22, thereby generating a sine wave signal at the element 33, 34. Depending on this signal, the polarity change circuit 48 selects the rotational direction of the spindle 12. The output signal, as rectified in the waveform rectifying circuit 49, goes into the differential circuit 50 and then a signal wave for one cycle is split into four pulses by the quarter divider circuit 51. The pulses from said quarter circuit 51 are counted by the reversible counter circuit 52 and the indicator 42 driven by the display circuit 53 makes a digital display of measured results.

For inch unit display, the button 45 acts to operate the inch/millimeter converter 54, thereby making a digital display in inch unit.

When the micrometer is to be broken to pieces for repair or replacement, at first the panel 41 and the covering 40 are taken off; the IC arithmetic unit 38 is taken down; then the block 15 and the plate 16 are removed; and the clamp screw 21 is unfastened. Thereafter with the screw 7 removed, the covering 9 is taken off the arm 1b. Thus the spindle 12, the retainer 6, the bushing 5, the index scale 22, the slit disc 26, the tubular piece 17, the clamp ring 20 and the spacer 24 can be pulled out as one body. The tubular piece 17 can be detached from the spindle 12 by unfitting the key 19.

As described above, the present invention is constituted such that a tubular cavity is formed in the arm of a frame movably supporting the spindle; and in this cavity a rotary encoder is housed which converts the measured results to an electric signal, whereby the measurement can be done without affecting the function of the micrometer. Since a tubular cavity is formed in the arm of the frame, the member to be built into this cavity can be made circular, which facilitates centering and movement of the spindle. Moreover, the constitution which permits assembling and disassembling is found very convenient for maintenance.

What is claimed is:

1. An electrical digital display micrometer comprising:
   A. a U-shaped frame with a small-diameter hole bored in one arm thereof and a large-diameter through hole axially aligned with said hole and bored in the other arm;
   B. an anvil fitted in the small-diameter hole of said frame;
   C. a ring retainer dismountably attached to one opening of said through hole in said U-shaped frame;
   D. a sleeve dismountably attached to the other opening of said through hole in said U-shaped frame;
   E. a spindle supported by said retainer and said sleeve for movement toward and away from, said anvil;
   F. a tubular piece externally mounted on said spindle and interposed between said retainer and said sleeve and linked to said spindle by means of key and key groove;
   G. an index scale of disc form fitted to said retainer;
   H. a slit disc fitted to said tubular piece in opposition to said index scale; and
   I. sensor means responsive to rotation of said slit disc relative to said index scale to effect a digital display of a measured value;
   and wherein a spacer is inserted between the index scale and the slit disc and the tubular piece is urged by a spring toward the retainer.

2. The electrically digital display micrometer of claim 1, wherein said index scale and said slit disc are aligned axially with said spindle.

3. The electrically digital display micrometer of claim 1, wherein said index scale is a metal plate with slits provided on the surface thereof by etching or electric discharging.

4. An electrical digital display micrometer comprising:
   A. a U-shaped frame with a small-diameter hole bored in one arm thereof and a large-diameter through hole axially aligned with said hole and bored in the other arm;
   B. an anvil attached to the small-diameter hole of said U-shaped frame;
   C. a ring retainer dismountably fitted to one opening of said through hole in said U-shaped frame;
   D. a sleeve dismountably fitted to the other opening of said through hole in said U-shaped frame;
   E. a spindle supported by a bushing and said sleeve for movement toward and away from, said anvil;
   F. a tubular piece externally mounted on said spindle and interposed between said bushing and said sleeve and linked to said spindle by means of key and key groove;
   G. an index scale of disc form attached to said ring retainer;
   H. a slit disc attached to said tubular piece;
   I. a light-emitting element and light-receiving elements located across said index scale and said slit disc; and
   J. an arithmetic unit to count the pulses generated through relative rotation between said index scale and said slit disc and thereby drive the display unit;
   and wherein said arithmetic unit is composed of a polarity change circuit, a waveform rectifying circuit to rectify the sine wave output from the light-receiving elements to a rectangular wave, a differential circuit to yield a differential wave from the rectangular output of said waveform rectifying circuit, a quarter divider circuit to split the differential circuit output into quarters, and a reversible counter circuit to count the pulse number by the pulses from said quarter divider circuit by addition/subtraction signals.

5. The electrically digital display micrometer of claim 4, wherein said arithmetic unit includes an inch/millimeter converter.

6. The electrically digital display micrometer of claim 4, wherein said arithmetic unit consists of a large-scale integrated circuit.

7. The electrically digital display micrometer of claim 4, wherein a spacer is provided between the index scale and the slit disc; and the tubular piece is urged by a spring toward the retainer.

8. The electrically digital display micrometer of claim 4, wherein the index scale and the slit disc are located coaxial with the spindle.

9. The electrically digital display micrometer of claim 4, wherein the index scale is a metal plate with slits provided on the surface thereof by etching or electric discharging.

10. An electrical digital display micrometer comprising:
    A. a U-shaped frame with a small-diameter hole bored in one arm thereof and a large-diameter through hole axially aligned with said hole and bored in the other arm;
    B. an anvil attached to the small-diameter hole of said U-shaped frame;
    C. a ring retainer dismountably fitted to one opening of said through hole in said U-shaped frame;
    D. a sleeve dismountably fitted to the other opening of said through hole in said U-shaped frame;
    E. a spindle supported by a bushing and said sleeve for movement toward and away from said anvil;
    F. a tubular piece externally mounted on said spindle and interposed between said bushing and said sleeve and linked to said spindle by means of key and key groove;
    G. an index scale of disc form attached to said ring retainer;
    H. a slit disc attached to said tubular piece;
    I. a light-emitting element and light-receiving elements located across said index scale and said slit disc;
    J. an arithmetic unit to count the pulses generated through relative rotation between said index scale and said slit disc and thereby drive the display unit;

wherein a light-receiving element to detect the quantity of light from said light-emitting element is provided; and wherein a circuit is added to compensate for variations, due to temperature change, in the quantity of light from the light-emitting element, based on the voltage generated in the light-receiving element when the two partial voltages of power source are made as split by resistors, one via the light-receiving element, and the other directly given, to the integrating circuit for comparison.

11. An electrical digital display micrometer comprising:

A. a U-shaped frame with a small-diameter hole bored in one arm thereof and a large-diameter through hole axially aligned with said hole and bored in the other arm;

B. an anvil fitted in the small-diameter hole of said frame;

C. a ring retainer dismountably attached to one opening of said through hole in said U-shaped frame;

D. a sleeve dismountably attached to the other opening of said through hole in said U-shaped frame;

E. a spindle supported by said retainer and said sleeve for toward and away from said anvil;

F. a tubular piece ecternally mounted on said spindle and interposed between said retainer and said sleeve and linked to said spindle by means of key and key groove;

G. an index scale of disc form fitted to said retainer;

H. a slit disc fitted to said tubular piece in opposition to said index scale;

I. sensor means responsive to rotation of said slit disc relative to said index scale to effect a digital display of a measured value;

J. a sleeve of an external diameter smaller than said through hole and supported by said frame coaxially of said spindle, said sleeve projecting from said frame in a direction away from the anvil;

K. said spindle having a threaded portion extending into said sleeve;

L. a thimble fixed to said spindle for rotation therewith, said thimble surrounding said sleeve and having an external diameter less than said through hole; and M. cooperating scale graduations on said sleeve and said thimble.

* * * * *